US006455617B1

(12) United States Patent
Gay et al.

(10) Patent No.: US 6,455,617 B1
(45) Date of Patent: Sep. 24, 2002

(54) STABILIZATION OF SILICON-ELASTOMER MOULDS

(75) Inventors: Michel Gay, Villeurbanne; Fabienne Howe, Caluire; Christian Pusineri, Serezin du Rhone; Joëlle Viennet, Mornant, all of (FR)

(73) Assignee: Rhodia Chimie, Boulogne Billancourt Cedex (FR)

( * ) Notice: Subject to any disclaimer, the term of this patent is extended or adjusted under 35 U.S.C. 154(b) by 0 days.

(21) Appl. No.: 09/582,400

(22) PCT Filed: Dec. 18, 1998

(86) PCT No.: PCT/FR98/02777

§ 371 (c)(1),
(2), (4) Date: Jun. 23, 2000

(87) PCT Pub. No.: WO99/33911

PCT Pub. Date: Jul. 8, 1999

(30) Foreign Application Priority Data

Dec. 26, 1997 (FR) .............................. 97 16816

(51) Int. Cl.$^7$ ..................... C08K 5/3432; C08K 5/36
(52) U.S. Cl. ................ 524/100; 524/102; 524/106; 524/147; 524/303; 524/304; 524/305; 524/392; 524/710; 524/720; 524/750; 524/588
(58) Field of Search ................ 524/588, 100, 524/102, 106, 147, 303, 305, 304, 392, 710, 720, 750

(56) References Cited

U.S. PATENT DOCUMENTS 5,814,695 A * 9/1998 Fitzgerald et al. .......... 524/731
6,172,150 B1 * 1/2001 Kollmann et al. .......... 524/379

FOREIGN PATENT DOCUMENTS

| DE | 43 101593 | 10/1994 | ........... C08L/83/04 |
| EP | 0 070 786 | 1/1983 | ........... C08G/77/08 |
| EP | 0 076 630 | 4/1983 | ........... C08L/83/06 |
| EP | 0 787 766 | 8/1997 | ............ C08K/5/00 |
| FR | 2208937 | 6/1974 | ........... C08G/47/10 |

OTHER PUBLICATIONS

Patent Abstracts of Japan, vol. 008, No. 134 (C–230), Jun. 21, 1984, & JR 59 045329 A (Toushiba Silicone KK). Mar. 14, 1984.
International Search Report.

* cited by examiner

Primary Examiner—Margaret G. Moore

(57) ABSTRACT

The invention concerns the use, for increasing the durability of moulds made of silicone elastomer crosslinkable by a poly addition or polycondensation reaction, of additive capable of stabilizing the silicone elastomer constituting the mold with respect to materials to be molded, of an additive selected among: (a) antioxidant additives comprising, in their structure additives containing at least one R—$S_q$—R' group in which R and R' are monovalent hydrocarbon groups with at least 3 carbon atoms or a monovalent hydrocarbon group with an ester bond or R and R' together form a cycle, q being a whole number between 1 and 3 inclusively, (b) additives inhibitors of free radicals capable, in moulding conditions of generating radicals =N—O; the invention concerns the synergistic combination of (a)+(b), the synergistic combination of (a) and/or (b) with phosphites (c), except for the use of bis(1-octyloxy-2,2,6,6-tetramethyl-4-piperidyl) sebacate as only additive in a silicone elastomer mould cross-linked by polycondensation.

12 Claims, No Drawings

STABILIZATION OF SILICON-ELASTOMER MOULDS

This application is an application under 35 U.S.C. Section 371 of International Application Number PCT/FR98/02777 filed on Dec. 18, 1998.

The present invention relates to the use of additives for the stabilization of the constituent silicone elastomers of moulds obtained by the crosslinking of polyaddition or polycondensation compositions.

Another subject-matter of the invention is polyaddition and polycondensation compositions capable of being used for the preparation of these silicone elastomers.

A further subject-matter of the invention is the moulds thus obtained for the reproduction by moulding of decorative and industrial objects.

Another subject-matter of the invention is a process for the preparation of silicone moulds.

Silicone compositions, in particular silicone polycondensation compositions, are used for the reproduction by moulding of decorative and industrial objects. The reproduction of objects consists, in a first step, in manufacturing a negative of the object to be copied, this negative being prepared from silicone elastomer and being named "membrane". After crosslinking the silicone, the membrane is separated from the starting object. This membrane constitutes the mould which will be used for the reproduction of the object to be copied.

This type of mould is widely used for the reproduction of objects made of resin, such as polyester resin, capable of faithfully reproducing the finest details of the object to be copied. Numerous reproductions can thus be manufactured. However, during this use, the mould is subjected to gradual modifications: the constituents of the polyester resins, in particular styrene, diffuse into the membrane and are polymerized. At the same time, the physicochemical structure of the mould in contact with the resins changes: it gradually hardens while losing its antiadhesive nature and its tear strength. These modifications finally result in surface fragments of the mould being torn off when the polyester item is removed from the mould. At this stage, the mould is no longer usable.

Various degradation mechanisms are involved. They can depend just as much on criteria related to the silicone elastomers as to the resins or to the moulding conditions. For example, the use of resins with a high content of styrene or of peroxide is an aggravating factor as it increases the possibilities of diffusion of the styrene or of the peroxide. The exothermic nature of the polymerization of the resin is also an aggravating factor. The variety of the factors which can influence the degradation of the silicone mould means that, until now, the solutions provided have never been entirely satisfactory.

European Patent Application EP-A-787 766 provides an improvement to the longevity of silicone moulds by incorporating, in the polycondensation composition, an additive selected from a group composed of sterically hindered phenols, sterically hindered bisphenols, sterically hindered thiobisphenols, zinc dialkyldithiophosphates, zinc diaryldithiophosphates, aromatic amines or sterically hindered amines which can be 1-alkyl sebacates with a terminal NR group.

The need still exists for an improvement in the lifetime of silicone moulds and thus for additives which make it possible to achieve this objective.

An objective of the present invention is thus to provide additives which make it possible to protect the elastomer constituting the silicone mould with respect to the resin which is used to produce the item to be moulded, in particular polyester resin, so as to make it possible to carry out a greater number of mouldings than that which was achievable previously, while maintaining, indeed even improving, the surface appearance of the moulded items.

The Applicant Company has found that additives comprising R—S—R groups in their structure make it possible to increase the longevity of silicone moulds in unexpected proportions, this being when the silicone mould originates from the crosslinking of a polyaddition composition or of a polycondensation composition.

The Applicant Company has also found that the combination of these additives or of phosphites with an additive capable of generating

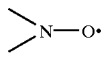

groups also makes it possible to increase the longevity of the moulds, these additives behaving synergistically.

The Applicant Company has also found, surprisingly, that the additives capable of generating

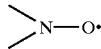

groups are effective by themselves alone, including the 1-alkyl sebacates with a terminal —NOR group, whereas the same 1-alkyl sebacates with an —NR group as disclosed in EP-A-787 766 are less effective and do not behave synergistically with the other additives according to the invention.

The incorporation of thioesters in a silicone composition has already been disclosed.

EP-A-076,630 relates to the specific case of silicone polycondensation compositions catalysed by a catalyst based on chelated titanium. The addition of a thioester or other additives, such as di(tert-butyl)phenol, prevents the elastomer from turning yellow in colour over time under the effect of the chelated titanium catalyst.

EP-A-654,497 relates to the specific case of silicone polyaddition compositions comprising an agent for controlling the crosslinking, intended to prevent premature gelling at room temperature, which makes it possible to stabilize the composition, which will be crosslinked at the appropriate moment by heating. This application provides, as agent for controlling the crosslinking, triazines having at least one peroxy group on a carbon atom of the triazine nucleus and/or an organosulphur compound of formula $R^6$—$(S)_m$—$R^7$, in which $R^6$ and $R^7$ are monovalent groups having at least 3 carbon atoms or a monovalent hydrocarbonaceous group exhibiting an ester bond or $R^6$ and $R^7$, taken together, form a ring, m being an integer from 1 to 3.

A subject-matter of the present invention is the use, for increasing the longevity of moulds produced from silicone elastomer crosslinking by a polyaddition or polycondensation reaction, of an additive capable of stabilizing the silicone elastomer constituting the mould with respect to materials to be moulded, the additive being chosen from the group consisting of:

(a) antioxidant additives comprising, in their structure, at least one R—$S_q$—R' group in which R and R' are monovalent hydrocarbonaceous groups having at least 3 carbon atoms or a monovalent hydrocarbonaceous group having an ester bond or R and R' together form a ring, q being an integer of between 1 and 3 inclusive, (b) additives which are inhibitors of free radicals and which are capable, under the conditions of the moulding, of generating at least one group:

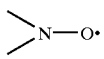

synergistic combination of (a)+(b),
synergistic combination of (a) and/or (b) with phosphites (c),
with the exception of the use of bis(1-octyl-oxy-2,2,6,6-tetramethyl-4-piperidyl) sebacate as sole additive in a mould made of silicone elastomer crosslinked by a polycondensation reaction.

More particularly, a subject-matter of the invention is such a use for the stabilization of the constituent silicone elastomers of moulds intended for the moulding of polyester items, in order in particular to prevent, within the silicone elastomer, the polymerization of the styrene resulting from the polyester resin, without interfering with the polymerization at the heart and at the surface of the polyester.

In a particularly preferred way, the use is targeted at obtaining a number of mouldings per mould increased by more than 10%, preferably by more than 20%, more particularly by more than 30%.

Another subject-matter of the invention is a process for the preparation of silicone moulds or of silicone elastomer capable of being used for the preparation of such moulds, in which process one or more additives in accordance with that which is disclosed hereinabove is/are added to a conventional elastomer-precursor silicone composition.

All the characteristics given hereinbelow apply to both these subject-matters.

Preference is given, among the additives (a), to:
(i) thiopropionates and in particular those of formula:

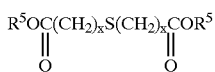

in which $R^5$ is an alkyl group having from 1 to 15 carbon atoms inclusive and x is an integer of between 1 and 4 inclusive,
among which thiopropionates may be mentioned:
ditridecyl thiodipropionate (CAS 10595-72-9)
distearyl 3,3'-thiodipropionate (CAS 693-36-7)
dilauryl 3,3'-thiodipropionate (CAS 123-28-4);
(ii) compounds comprising several thioether groups R—$S_q$—R' connected to a tetravalent carbon, preferably tetra(thioether)pentaerythritol, for example pentaerythritol tetra(laurylthiopropionate) or TLPE (CAS 29598-76-3); the thioether can be a dithioether, in particular a dithiopropionate as described hereinabove.

The phosphites (c) according to the invention are preferably alkyl phosphites, mixed aryl alkyl phosphites, aryl phosphites and various phosphites. For example:
triphenyl phosphite (formula I)
triisodecyl phosphite (II)
trilauryl phosphite (III)
dilauryl phosphite (IV)
diphenyl isodecyl phosphite (V)
diphenyl isooctyl phosphite (VI)
diphenyl 2-ethylhexyl phosphite (VII)
diisodecyl phenyl phosphite (VIII)
trimonononylphenyl phosphite (IX)
2,4-dinonylphenyl di(4-monononylphenyl) phosphite (X)
tris[2,4-di(tert-butyl)phenyl] phosphite (CAS 31570-04-4) (XI)
2,2-methylenebis[4,6-di(t-butyl)phenyl] octyl phosphite (XII)
product sold under the name Sandostab® P-EPQ by Sandoz AG, Basle, Switzerland (XIII)
$[CH_3(CH_2)_{11}S]_3P$ (XIV)
2,2'-ethylidenebis[4,6-di(t-butyl)phenyl] fluoro-phosphite (CAS 118337-09-0) (XIX).

The additives (b) preferably comprise at least one group:

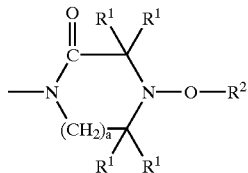

in which $R^2$ is hydrogen or a linear or branched $C_1$ to $C_{18}$ alkyl, optionally substituted by one or more phenyl groups, or a $C_5$ to $C_6$ cycloalkyl or benzyl, a is 0 or 1, preferably 1, and the $R^1$ radicals, which are identical to or different from one another, are chosen from linear or branched $C_1$ to $C_3$ alkyl, phenyl and benzyl radicals.

The additive (b) can also comprise at least one group:

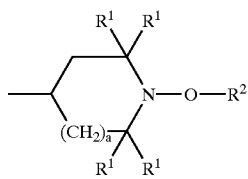

with the same meanings as hereinabove.

The additives (b) can also consist of a hydroxylamine N,N-disubstituted

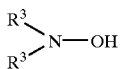

by sterically hindered hydrocarbonaceous groups $R^3$, such as, for example, di(tert-butyl)hydroxylamine.

The most preferred additives (b) are those of formula (Y):

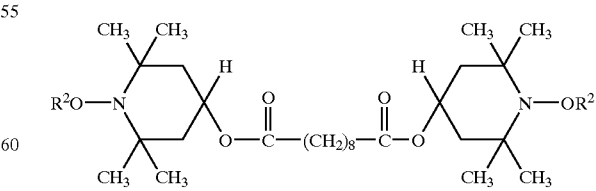

with the meanings as given above, and very particularly the following compound: bis(1-octyloxy-2,2,6,6-tetra-methyl-4-piperidyl) sebacate, with the expanded formula:

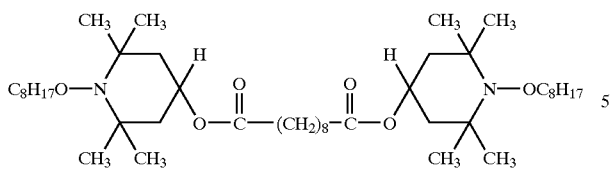

In the context of the polycondensation compositions, a specific subject-matter of the invention is the use of the additives (a), (a)+(b) and (a) and/or (b)+(c), optionally (b) alone, except of formula (Y) hereinabove.

The additive (a) can be used in particular in a proportion of 1 to 5 parts by weight per 100 parts of silicone composition, preferably of 1.5 to 3 inclusive.

The additive (b) can be used in particular in a proportion of 0.2 to 1 part by weight per 100 parts of silicone composition, it being known that the optimum amount is generally of the order of 0.5. Beyond, the effectiveness is not increased.

The additive (c) can be used in particular in a proportion of 0.05 to 1 part by weight per 100 parts of silicone composition, preferably of 0.1 to 0.3.

The invention can be applied just as easily to silicone compositions which can be crosslinked at room temperature (it being possible for the crosslinking to be accelerated under warm conditions) by polyaddition or polycondensation reaction.

The present invention applies in particular to the silicone compositions which are a precursor of a silicone elastomer comprising:
(A) a diorganopolysiloxane oil exhibiting reactive groups chosen from a) condensable, hydrolysable or hydroxyl terminal groups and b) alkenyl groups bonded to silicon;
(B) optionally a compound chosen from the group consisting of silanes comprising condensable or hydrolysable groups, in the case where (A) is chosen from the groups a), and of diorganopolysiloxane oil carrying hydrogen atoms, in the case where (A) is chosen from the groups b);
(C) a catalyst;
(D) optionally any other additive conventionally used in the type of composition under consideration.

A first group of silicones which can be used according to the invention therefore comprises diorganopolysiloxane compositions which can be cured to a silicone elastomer by polycondensation reactions comprising:
(A): at least one diorganopolysiloxane oil carrying, at each end of the chain, at least two condensable or hydrolysable groups or a single hydroxyl group,
(B): a silane comprising at least three condensable or hydrolysable groups and/or a product originating from the partial hydrolysis of this silane, when (A) is an oil with hydroxyl ends,
(C): a catalyst for the polycondensation of the oil.

In that which follows or that which precedes, unless otherwise mentioned, the percentages are by weight.

The diorganopolysiloxane oils (A) which can be used in the compositions according to the invention are more particularly those corresponding to the formula (1):

$$Y_nSiR_{3-n}O(SiR_2O)_xSiR_{3-n}Y_n \qquad (1)$$

in which:
R represents identical or different monovalent hydrocarbonaceous radicals, Y represents identical or different hydrolysable or condensable groups or hydroxyl groups, n is chosen from 1, 2 and 3, with n=1 when Y is hydroxyl, and x is an integer greater than 1, preferably greater than 10.

The viscosity of the oils of formula (1) is between 50 and $10^6$ mPa·s at 25° C. Mention may be made, as examples of R radicals, of alkyl radicals having from 1 to 8 carbon atoms, such as methyl, ethyl, propyl, butyl, hexyl and octyl, vinyl radicals or phenyl radicals.

Mention may be made, as examples of substituted R radicals, of 3,3,3-trifluoropropyl, chlorophenyl and β-cyanoethyl radicals.

In the products of formula (1) generally used industrially, at least 60% by number of the R radicals are methyl radicals, the other radicals generally being phenyl and/or vinyl radicals.

Mention may be made as examples of hydrolysable Y groups, of the amino, acylamino, aminoxy, ketiminoxy, iminoxy, enoxy, alkoxy, alkoxyalkyleneoxy, acyloxy and phosphate groups and, for example, among these:
for amino Y groups: n-butylamino, sec-butylamino and cyclohexylamino groups,
for N-substituted acylamino groups: the benzoylamino group,
for aminoxy groups: the dimethylaminoxy, diethylaminoxy, dioctylaminoxy and diphenylaminoxy groups,
for iminoxy and ketiminoxy groups: those derived from acetophenone oxime, acetone oxime, benzophenone oxime, methyl ethyl ketoxime, diisopropyl ketoxime and chlorocyclohexanone oxime,
for alkoxy Y groups: the groups having from 1 to 8 carbon atoms, such as the methoxy, propoxy, isopropoxy, butoxy, hexyloxy and octyloxy groups,
for alkoxyalkyleneoxy Y groups: the methoxyethyleneoxy group,
for acyloxy Y groups: the groups having from 1 to 8 carbon atoms, such as the formyloxy, acetoxy, propionyloxy and 2-ethylhexanoyloxy groups,
for phosphate Y groups: those deriving from the dimethyl phosphate, diethyl phosphate and dibutyl phosphate groups.

Mention may be made, as condensable Y groups, of hydrogen atoms and halogen atoms, preferably chlorine.

When, in the above formula (1), the Y groups are hydroxyl groups, n is then equal to 1 and it is necessary, in order to prepare polyorganosiloxane elastomers from the polymers of above formula (1), to use, in addition to the condensation catalysts, crosslinking agents (B) which are silanes of the general formula:

$$R_{4-a}SiY'_a \qquad (2)$$

in which:
R has the meanings given above in the formula (1), Y' represents identical or different hydrolysable or condensable groups and a is equal to 3 or 4.

The examples given for the Y groups are applicable to the Y' groups.

It is desirable to use silanes of formula (2) even in the case where, in the oil (A), Y is not a hydroxyl group.

In this case, it is desirable to use Y groups of the oil (A) which are identical to the Y' groups of the silane (B).

The α,ω-dihydroxylated diorganopolysiloxanes of the formula (1) are generally oils with viscosities varying from 500 mPa·s at 25° C. to 500,000 mPa·s at 25° C., preferably 800 to 400,000 mPa·s at 25° C. These are linear polymers composed essentially of diorganosiloxyl units of formula ($R_2SiO$).

However, the presence of other units, generally present as impurities, such as $RSiO_{3/2}$, $RSiO_{1/2}$ and $SiO_{4/2}$, is not excluded in the proportion in particular of at least 1% with respect to the number of diorganosiloxyl units.

The organic radicals, bonded to the silicon atoms of the base oils, represented by the R symbol can be chosen from alkyl radicals having from 1 to 3 carbon atoms, such as the methyl, ethyl or n-propyl radicals, the vinyl radical, the phenyl radical, the 3,3,3-trifluoropropyl radical and the β-cyanoethyl radical.

Preferably, at least 60% of all the R radicals are methyl radicals and at most 1% are vinyl radicals.

Mention may be made, as illustration of units represented by the formula $R_2SiO$, of those of formulae: $(CH_3)_2SiO$; $CH_3(CH_2=CH)SiO$; $CH_3(C_6H_5)SiO$; $CF_3CH_2CH_2(CH_3)SiO$; $NC-CH_2CH_2(CH_3)SiO$; $NC-CH_2(C_6H_5)SiO$.

These base oils are, in the great majority of cases, sold by the manufacturers of silicones. Furthermore, their manufacturing techniques are well known; they are found disclosed, for example, in French Patents FR-A-1,134,005, FR-A-1,198,749 and FR-A-1,226,745.

Mention may more particularly be made, as examples of monomeric silanes (B) of formula (2), of polyacyloxysilanes, polyalkoxysilanes, polyketiminoxysilanes and polyiminoxysilanes and in particular the following silanes:

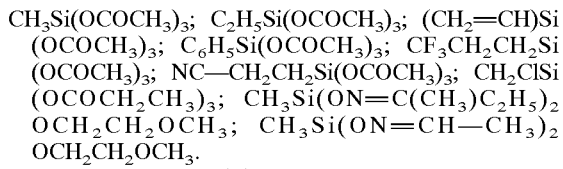

The above silanes (B), in combination with α,ω-dihydroxylated polydiorganosiloxanes of formula (1), can be used in single-component compositions which are stable with the exclusion of air.

Mention may be made, as examples of monomeric silanes of formula (2) which, in combination with α,ω-dihydroxylated polydiorganosiloxanes of formula (1), can advantageously be used in two-component compositions, of polyalkoxysilanes and in particular those of formulae:

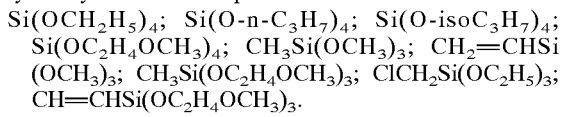

The monomeric silanes described hereinabove can be substituted, in all or in part, by polyalkoxypolysiloxanes, each molecule of which numbers at least two, preferably three, Y' atoms, the other valencies of the silicon being satisfied by SiO and SiR siloxane bonds.

Mention may be made, as examples of polymeric crosslinking agents, of poly(ethyl silicate).

Use is generally made of 0.1 to 20 parts by weight of crosslinking agent of formula (2) per 100 parts by weight of polymer of formula (1).

The polyorganosiloxane compositions which can be cured to an elastomer of the type which is described hereinabove comprise from 0.001 to 10 parts by weight, preferably from 0.05 to 3 parts by weight, of condensation catalyst (C) per 100 parts by weight of polysiloxane of formula (1).

The content of condensation catalyst in the single-component compositions is generally much lower than that used in the two-component compositions and is generally between 0.001 and 0.05 part by weight per 100 parts by weight of polysiloxane of formula (2).

The crosslinking agents (B) of formula (2), whether they can be used for the preparation of single-component or two-component compositions, are products accessible on the silicones market; furthermore, their use in compositions which cure from room temperature is known; it figures in particular in French Patents FR-A-1,126,411, FR-A-1,179,969, FR-A-1,189,216, FR-A-1,198,749, PR-A-1,248,826, FR-A-1,314,649, FR-1,423,477, FR-1,432,799 and FR-A-2,067,636.

The compositions according to the invention can additionally comprise reinforcing or semi-reinforcing or bulking fillers which are preferably chosen from siliceous fillers.

The reinforcing fillers are preferably chosen from fumed silicas and precipitated silicas. They have a specific surface, measured according to the BET method, of at least 50 $m^2/g$, preferably of greater than 70 $m^2/g$, a mean size of the primary particles of less than 0.1 μm (micrometre) and a bulk density of less than 200 g/liter.

These silicas can be incorporated as is or after having been treated with organosilicon compounds commonly used for this use. Methylpolysiloxanes, such as hexamethyldisiloxane, octamethyldisiloxane or octamethlcyclotetrasiloxane, methylpolysilazenes, such as hexamethyldisilazane or hexamethylcyclotrisilazane, chlorosilanes, such as dimethylchlorosilane, trimethylchlorosilane, methylvinyldichlorosilane or dimethylvinylchlorosilane, and alkoxysilanes, such as dimethyldimethoxysilane, dimethylvinylethoxysilane or trimethylmethoxysilane, appear among these compounds.

During this treatment, the silicas can increase their starting weight up to a level of 20%, preferably 18%, approximately.

The semi-reinforcing or bulking fillers have a particle size of greater than 0.1 μm (micrometer) and are chosen from ground quartz, calcined clays and diatomaceous earths.

Use may generally be made of 0 to 100 parts, preferably of 5 to 80 parts, of filler per 100 parts of oil (A).

The bases for silicone compositions defined in a general way hereinabove are well known to a person skilled in the art. They are described in detail in the literature and the majority are commercially available.

These compositions crosslink at room temperature in the presence of atmospheric moisture and/or moisture present in the composition. They are divided into two main families. The first family is composed of single-component compositions or compositions comprising a single package which are stable on storage with the exclusion of atmospheric moisture and which cure to an elastomer with atmospheric moisture. In this case, the condensation catalyst (C) used is a metal compound, generally a tin, titanium or zirconium compound.

Depending on the nature of the condensable or hydrolysable groups, these single-component compositions are said to be acidic, neutral or basic.

Mention may be made, as acidic compositions, of, for example, the compositions disclosed in U.S. Pat. Nos. 3,035,016, 3,077,465, 3,133,891, 3,409,573, 3,438,930, 3,647,917 and 3,886,118.

Use may be made, as neutral compositions, of, for example, the compositions disclosed in U.S. Pat. Nos. 3,065,194, 3,542,901, 3,689,454, 3,779,986, GB-A-2,052,540, U.S. Pat. No. 4,417,042 and EP-A-69,256.

Use may be made, as basic compositions, of, for example, the compositions disclosed in U.S. Pat. Nos. 3,378,520, 3,364,160, 3,417,047, 3,742,004 and 3,758,441.

Use may also be made, according to a preferred alternative form, of single-component flowing compositions, such as those disclosed in U.S. Pat. Nos. 3,922,246, 3,956,280 and 4,143,088.

The second family, which is the preferred family in the context of the present invention, is composed of two-component compositions or compositions comprising two packages which generally comprise an α,ω-dihydroxydiorganopolysiloxane oil (A), a silane (B) or a product originating from partial hydrolysis of this silane, and a catalyst (C) which is a metal compound, preferably a tin compound, and/or an amine.

Examples of such compositions are disclosed in U.S. Pat. Nos. 3,678,002, 3,888,815, 3,933,729, 4,064,096 and GB-A-2,032,936.

Preference is more particularly given, among these compositions, to the two-component compositions comprising:

(A): 100 parts of an α,ω-dihydroxydiorganopolysiloxane oil with a viscosity of 50 to 300,000 mPa·s, the organic radicals of which are chosen from methyl, ethyl, vinyl, phenyl and 3,3,3-trifluoropropyl radicals, at least 600 by number being methyl radicals, up to 20% by number being phenyl radicals and at most 2% being vinyl radicals, (B): from 0.5 to 15 parts of a polyalkoxysilane or polyalkoxysiloxane, (C): from 0.01 to 1 part (calculated as weight of tin metal) of a catalytic tin compound, from 0 to 100 parts, preferably from 5 to 80 parts, of siliceous inorganic filler.

The tin catalysts (C) are extensively described in the above literature; this can be in particular a tin salt of a mono- or dicarboxylic acid. These tin carboxylates are described in particular in the work by Noll (Chemistry and Technology of Silicones, page 337, Academic Press, 1968, $2^{nd}$ edition).

Mention may in particular be made of the naphthenate, the octanoate, the oleate, the butyrate, dibutyltin dilaurate or dibutyltin diacetate.

Use may also be made, as catalytic tin compound, of the reaction product of a tin salt, in particular of a tin dicarboxylate, with poly(ethyl silicate) as disclosed in U.S. Pat. No. 3,186,963.

Use may also be made of the reaction product of a dialkyldialkoxysilane with a tin carboxylate, as disclosed in U.S. Pat. No. 3,862,919.

Use may also be made of the reaction product of an alkyl silicate or of an alkyltrialkoxysilane with dibutyltin diacetate, as disclosed in Belgian Patent BE-A-842,305.

Preference is more particularly given, among the crosslinking agents (B), to alkyltrialkoxysilanes, alkyl silicates and poly(alkyl silicate)s in which the organic radicals are alkyl radicals having from 1 to 4 carbon atoms.

The alkyl silicates can be chosen from methyl silicate, ethyl silicate, isopropyl silicate, n-propyl silicate and the polysilicates chosen from the products from the partial hydrolysis of these silicates; these are polymers composed of a high proportion of units of formula $(R^4O)_3SiO_{0.5}$, $R^4OSiO_{1.5}$, $(R^4O)_2SiO$ and $SiO_2$, the $R^4$ representing the methyl, ethyl, isopropyl or n-propyl radicals. Their characterization is usually based on their silica content, which is established by quantitative determination of the product from the hydrolysis of a sample.

Use may in particular be made, as polysilicate, of a partially hydrolysed ethyl silicate sold under the trade name "Ethyl Silicate-40®" by Union Carbide Corporation or a partially hydrolysed propyl silicate.

The polycondensation compositions can additionally comprise from 10 to 130 parts by weight of polydimethylsiloxane oil(s) blocked at each of the chain ends by a $(CH_3)_3SiO_{0.5}$ unit, with a viscosity at 25° C. of between 10 and 5000 mPa·s, per 100 parts of oil(s) (A).

The compositions according to the invention can be shaped, extruded or in particular moulded according to varied shapes and can then be cured at room temperature to an elastomer with atmospheric moisture or with addition of water. Gentle heating at a temperature of 20 to 150° C. can accelerate the curing.

A second group of silicones which can be used according to the invention relates to a silicone polyaddition composition which can be cured to an elastomer by hydrosilylation reactions, characterized in that it comprises:

(A): at least one diorganopolysiloxane oil exhibiting, per molecule, at least two alkenyl groups, preferably vinyl groups, bonded to silicon, (B): at least one diorganopolysiloxane oil exhibiting, per molecule, at least three hydrogen atoms bonded to silicon, (C): a catalytically effective amount of a catalyst which is generally a compound of a metal from the platinum group.

In that which follows or that which precedes, unless otherwise mentioned, the percentages and parts are by weight.

The amounts of (A) and (B) are generally chosen so that the molar ratio of the hydrogen atoms bonded to silicon in (B) to the vinyl radicals bonded to silicon in (A) is generally between 0.4 and 10, preferably between 0.6 and 5.

The vinyl groups in (A) and the hydrogen atoms in (B) are generally bonded to different silicon atoms.

These compositions crosslink by an addition reaction (also known as a hydrosilylation reaction), catalysed by a compound of a metal from the platinum group, of a vinyl group of the organopolysiloxane (A) with a hydride functional group of the organopolysiloxane (B).

The vinylated organopolysiloxane (A) can be an organopolysiloxane exhibiting siloxyl units of formula:

  (1)

in which Y is a vinyl group, Z is a monovalent hydrocarbonaceous group not having an unfavourable effect on the activity of the catalyst, Z generally being chosen from alkyl groups having from 1 to 8 carbon atoms inclusive, such as the methyl, ethyl, propyl and 3,3,3-trifluoropropyl groups, and aryl groups, such as xylyl, tolyl and phenyl, a is 1 or 2, b is 0, 1 or 2 and a+b is between 1 and 3, all the other units optionally being units of mean formula:

  (2)

in which Z has the same meaning as hereinabove and c has a value of between 0 and 3.

The organopolysiloxane (B) can be an organohydropolysiloxane comprising siloxyl units of formula:

  (3)

in which W is a monovalent hydrocarbonaceous group not having an unfavourable effect on the activity of the catalyst which corresponds to the same definition as Z, d is 1 or 2, e is 0, 1 or 2, and d+e has a value of between 1 and 3, all the other units optionally being units of mean formula:

  (4)

in which W has the same meaning as hereinabove and g has a value of between 0 and 3.

All these limiting values of a, b, c, d and g are inclusive.

The organopolysiloxane (A) can be formed solely of units of formula (1) or can additionally comprise units of formula (2).

The organopolysiloxane (A) can exhibit a linear, branched, cyclic or network structure. The degree of polymerization is 2 or more and is generally less than 5000. Furthermore, if the organopolysiloxane (A) is linear, it exhibits a viscosity at 25° C. of less than 500,000 mPa·s.

Z is generally chosen from the methyl, ethyl and phenyl radicals, 60 mol % at least of the Z radicals being methyl radicals.

The organopolysiloxanes (A) and (B) are well known and are disclosed, for example, in U.S. Pat. Nos. 3,220,972, 3,284,406, 3,436,366, 3,697,473 and 4,340,709.

Examples of siloxyl units of formula (1) are the vinyldimethylsiloxyl unit, the vinylphenylmethylsiloxyl unit, the vinylsiloxyl unit and the vinylmethylsiloxyl unit.

Examples of siloxyl units of formula (2) are the $SiO_{4/2}$, dimethylsiloxane, methylphenylsiloxane, diphenylsiloxane, methylsiloxane and phenylsiloxane units.

Examples of organopolysiloxane (A) are dimethylpolysiloxanes comprising dimethylvinylsiloxyl ends, methylvinyldimethylpolysiloxane copolymers comprising trimethylsiloxyl ends, methylvinyldimethylpolysiloxane copolymers comprising dimethylvinylsiloxyl ends and cyclic methylvinylpolysiloxanes.

The organopolysiloxane (B) can be formed solely of units of formula (3) or additionally comprises units of formula (4).

The organopolysiloxane (B) can exhibit a linear, branched, cyclic or network structure. The degree of polymerization is 2 or more and is generally less than 5000.

The W group has the same meaning as the above Z group.

Examples of units of formula (3) are:

$H(CH_3)_2SiO_{1/2}$, $HCH_3SiO_{2/2}$ or $H(C_6H_5)SiO_{2/2}$.

The examples of units of formula (4) are the same as those given above for the units of formula (2).

Examples of organopolysiloxane (B) are dimethylpolysiloxanes comprising hydrodimethylsilyl ends, dimethylhydromethylpolysiloxane copolymers comprising trimethylsiloxyl ends, dimethylhydromethylpolysiloxane copolymers comprising hydrodimethylsiloxyl ends, hydromethylpolysiloxanes comprising trimethylsiloxyl ends and cyclic methylvinylpolysiloxanes.

The ratio of the number of hydrogen atoms bonded to silicon in the organopolysiloxane (B) to the number of groups comprising alkenyl unsaturation of the organopolysiloxane (A) is between 0.4 and 10, preferably between 0.6 and 5. However, this ratio can be between 2 and 5, if it is desired to form elastomer foams.

The organopolysiloxane (A) and/or the organopolysiloxane (B) can be diluted in a nontoxic organic solvent compatible with silicones.

The network organopolysiloxanes (A) and (B) are commonly known as silicone resins.

The bases for the silicone polyaddition compositions may comprise only linear organopolysiloxanes (1) and (2), such as, for example, those disclosed in the above mentioned U.S. Pat. Nos. 3,220,972, 3,697,473 and 4,340,709, or may, at the same time, comprise branched or network organopolysiloxanes (A) and (B), such as, for example, those disclosed in the above mentioned U.S. Pat. Nos. 3,284,406 and 3,436,366.

The polyaddition composition can additionally comprise from 5 to 40 parts by weight of polydimethylsiloxane oil(s) blocked in each of the chain ends by a $(CH_3)_3SiO_{0.5}$ unit, with a viscosity of 25° C. of between 10 and 5000 mPa·s, per 100 parts of the organopolysiloxanes (A)+(B).

The catalysts (C) are also well known.

Platinum and rhodium compounds are preferably used.

Use may be made of the complexes of platinum and of an organic product disclosed in U.S. Pat. Nos. 3,159,601, 3,159,602 and 3,220,972 and European Patents EP-A-57,459, EP-A-188,978 and EP-A-190,530 and the complexes of platinum and of vinylated organopolysiloxane disclosed in the U.S. Pat. Nos. 3,419,593, 3,715,334, 3,377,432 and 3,814,730.

Use may be made of the rhodium complexes disclosed in the United Kingdom patents: GB-A-1,421,136 and GB-A-1,419,769.

Platinum catalysts are preferred.

In this case, the amount by weight of catalyst (C), calculated as weight of platinum metal, is generally between 2 and 600 ppm, in general between 5 and 200 ppm, based on the total weight of the organopolysiloxanes (A) and (B).

The preferred compositions in the context of the present invention are those which comprise:

(A): 100 parts of a diorganopolysiloxane oil blocked at each end of its chain by a vinyldiorganosiloxyl unit, the organic radicals, bonded to the silicon atoms, of which are chosen from the methyl, ethyl and phenyl radicals, at least 60 mol % of these radicals being methyl radicals, with a viscosity of 100 to 500,000, preferably of 1000 to 200,000, mPa·s at 25° C.;

(B): at least one organohydropolysiloxane chosen from liquid linear or network homopolymers and copolymers exhibiting, per molecule, at least 3 hydrogen atoms bonded to different silicon atoms, the organic radicals, bonded to the silicon atoms, of which are chosen from the methyl, ethyl and phenyl radicals, at least 60% of these radicals being methyl radicals, the product (B) being used in an amount such that the molar ratio of hydride functional groups to the vinyl groups is between 1.1 and 4;

(C): a catalytically effective amount of a platinum catalyst.

Even more preferably, up to 50% by weight of the polymer (A) is replaced by a network copolymer comprising trimethylsiloxyl, methylvinylsiloxyl and $SiO_{4/2}$ units, in which copolymer from 2.5 to 10 mol % of the silicon atoms comprise a vinyl group and in which copolymer the molar ratio of the trimethylsiloxyl groups to the $SiO_{4/2}$ groups is between 0.5 and 1.

The compositions according to the invention can additionally comprise reinforcing or semi-reinforcing or bulking fillers (E) as described hereinabove in the context of the polycondensation compositions.

Use may generally be made of 5 to 100 parts, preferably of 5 to 50 parts, of filler per 100 parts of the sum of the organopolysiloxanes (A)+(B).

The polyaddition compositions are generally stored in two packages. This is because they crosslink as soon as all their constituents are mixed. If it is desired to delay this crosslinking in order to obtain good homogenization of the active material, an inhibitor of the platinum catalyst can be added to the composition.

These inhibitors are well known. Use may in particular be made of organic amines, silazanes, organic oximes, dicarboxylic acid diesters, acetylenic alcohols, acetylenic ketones or vinylmethylcyclopolysiloxanes (see, for example, U.S. Pat. Nos. 3,445,420 and 3,989,667). The inhibitor is used in a proportion of 0.005 to 5 parts, preferably of 0.01 to 3 parts, per 100 parts of the constituent (A).

In order to obtain good homogenization in the distribution of the active material, it is in fact desirable for the silicone matrix to exhibit a degree of viscosity of the order of 5000 to 30,000 mPa·s at 25° C.

Such a viscosity can be obtained by a precrosslinking, the latter being blocked at the desired viscosity by addition of an inhibitor. Sufficient time is thus available to thoroughly homogenize the active material within the silicone matrix.

The crosslinking is then brought to completion by heating the matrix at a temperature such that the inhibitor no longer has an effect on the catalytic action of the platinum.

The compositions according to the invention can be cold kneaded as they are and can be formed, in particular moulded in various forms.

Another subject-matter of the invention is a silicone composition which is a precursor of a silicone elastomer comprising:

(A) a diorganopolysiloxane oil exhibiting reactive groups chosen from i) condensable, hydrolysable or hydroxyl terminal groups and ii) alkenyl groups, preferably vinyl groups, bonded to silicon;

(B) optionally a compound chosen from the group consisting of silanes comprising condensable or hydrolysable groups, in the case where (A) is chosen from the groups i), and of diorganopolysiloxane oil carrying hydrogen atoms, in the case where (A) is chosen from the groups ii);

(C) a catalyst, with the exception of a chelated titanium catalyst;

(D) optionally any other additive conventionally used in the type of composition under consideration;

(E) an additive capable of stabilizing the silicone elastomer constituting the mould with respect to the materials to be moulded, the additive being chosen from the group consisting of:

(a) antioxidant additives comprising, in their structure, at least one R—$S_q$—R' group in which R and R' are monovalent hydrocarbonaceous groups having at least 3 carbon atoms or a monovalent hydrocarbonaceous group having an ester bond or R and R' together form a ring, q being an integer between 1 and 3 inclusive, (b) additives which are inhibitors of free radicals and which are capable, under the conditions of the moulding, of generating radicals:

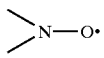

synergistic combination of (a)+(b),
synergistic combination of (a) and/or (b) with phosphites (c),
with the exception of the use of bis(1-octyloxy-2,2,6,6-tetramethyl-4-piperidyl) sebacate as sole additive in the case i), and
in the case 2i), the additive (a), when it is chosen, necessarily having to be used in combination with (b) and/or with (c).

A particular subject-matter of the invention is a silicone composition which is a precursor of a silicone elastomer and which can be crosslinked by a polycondensation reaction comprising:

(A): at least one diorganopolysiloxane oil carrying, at each end of the chain, at least two condensable or hydrolysable groups or a single hydroxyl group, (B): a silane comprising at least three condensable or hydrolysable groups and/or a product originating from the partial hydrolysis of this silane, when (A) is an oil comprising a hydroxyl end, (C): a catalyst for the polycondensation of the oil, with the exception of a chelated titanium catalyst, (E): an additive as defined hereinabove, that is to say with the exception of the use of bis (1-octyloxy-2,2,6,6-tetramethyl-4-piperidyl) sebacate as sole additive.

Another subject-matter of the invention is a silicone composition which is a precursor of a silicone elastomer and which can be crosslinked by a polyaddition reaction comprising:

(A): at least one diorganopolysiloxane oil exhibiting, per molecule, at least two alkenyl groups, preferably vinyl groups, bonded to silicon, (B): at least one diorganopolysiloxane oil exhibiting, per molecule, at least three hydrogen atoms bonded to silicon, (C): a catalytically effective amount of a catalyst which is a compound of a metal from the platinum group, (E): an additive as defined hereinabove, (a), when it is chosen, necessarily being used in combination with (b) and/or (c).

For the most preferred forms, reference is made to the information given above with respect to the constituents (A), (B), (C) and (E) and the various additives and synergistic combinations of additives. All combinations are possible.

It has been found that all the additives described here for improving the longevity of the mould can also be used with polyaddition compositions. This is surprising and unexpected for the additives of the sterically hindered amine type, such as, for example, the compounds of sebacic type, since the chemical nature of additives of this type was regarded as incompatible with these polyaddition compositions. These additives are regarded as highly capable of denaturing the platinum salts present in the platinum catalyst and thus of inhibiting the polyaddition reaction. Their use is only disclosed in the case of silicone compositions which crosslink by a polycondensation reaction, which compositions use other types of catalyst (EP-A-787,766). The specific amines according to the invention differ from those disclosed in EP-A-787,766 in their —NOR group and prove to be effective and useable in both types of silicone composition, polyaddition compositions and polycondensation compositions.

It has also been found that these sterically hindered amines even make it possible to improve the longevity of the silicone moulds obtained from polyaddition compositions.

Another subject-matter of the invention is therefore also a silicone composition which crosslinks by a polyaddition reaction and which comprises (A), (B), (C) and an additive (b), in the absence or in the presence of another additive (a) or (c).

A further subject-matter of the invention is the moulds made of silicone elastomer which are capable of being obtained by crosslinking a polyaddition or polycondensation composition as described hereinabove. Another subject-matter of the invention is the silicone elastomer obtained.

The present invention will now be described in more detail using embodiments taken as non-limiting examples.

EXAMPLE 1

Preparation of a Silicone Composition which Crosslinks at Room Temperature by Polycondensation Reaction 1) Base Mixture A base mixture is prepared by kneading:

16.9 parts (by weight) of pyrogenic silica, having a BET specific surface of 300 m$^2$/g, treated with hexamethyldisilazane, 30.2 parts of a polydimethylsiloxane oil blocked at each of the chain ends by a $(CH_3)_3SiO_{0.5}$ unit having a viscosity of 500 mPa·s at 25° C., 26.5 parts of a hydroxylated polydimethylsiloxane oil blocked at each of the chain ends by a $(CH_3)_2(OH)SiO_{0.5}$ unit having a viscosity of 14,000 mPa·s at 25° C., 10 parts of a colouring agent based on a mixture of $TiO_2$ (60% by weight) in a polydimethylsiloxane oil blocked at each of the chain ends by a $(CH_3)_3SiO_{0.5}$ unit having a viscosity of 1000 mPa·s at 25° C. (40% by weight), 14.2 parts of ground quartz exhibiting a mean particle diameter of 10 μm, 0.2 part of water, 0.2 part of a hydroxylated polydimethylsiloxane oil blocked at each of the chain ends by a $(CH_3)_2(OH)SiO_{0.5}$ unit having a viscosity of 75 mPa·s at 25° C., and the desired amount of additive(s).

2) Catalysed Mixture

The abovementioned base mixture is homogenized for 1 hour at 23° C. and 5 parts of catalyst, based on poly(ethyl silicate) (28% by weight) and on di-n-butyltin dilaurate (3% by weight) dissolved in a polydimethylsiloxane oil blocked at each of the chain ends by a $(CH_3)_3SiO_{0.5}$ unit having a viscosity of 50 mPa·s at 25° C., are added to 100 parts of this mixture.

3) Processing of the Silicone

The base mixture, catalysed as indicated hereinabove, is homogenized for approximately 1 minute at 23° C. and it is then degassed for approximately 10 minutes under a vacuum of $20 \times 10^2$ Pa. The product, thus degassed, is subsequently cast in appropriate moulds. The moulded product is crosslinked at room temperature (23° C.) and the moulds are emptied after 4 days.

4) Comparative Tests (Table 1) were Carried Out on the Basis of Different Additives. Details Regarding Certain Additives are Given Hereinbelow Thiodipropionate=ditridecyl thiodipropionate Tinuvin 123 (Ciba-Geigy)=bis(1-octyloxy-2,2,6,6-tetramethyl-4-piperidyl) sebacate Tinuvin 765 (Ciba-Geigy)=bis(1-octyloxy-2,2,6,6-pentamethyl-4-piperidyl) sebacate Phenolic phosphite 29: compound (XI)

Phenolic phosphite 32: compound (XII)

The results are given as number of polyester items which it was possible to mould with a mould additivated as indicated.

The polyester resin which is used for the mouldings is a resin sold by DSM (BASF) France under the name Synolite® 0328-A-1. The processing is as follows:

0.2 part by weight of cobalt octoate (activator) is added to 100 parts of resin and then 2 parts by weight of methyl ethyl ketone peroxide are added per 100 parts of the preceding mixture.

TABLE 1

| Additives | | Result (number of items) | | | | | |
|---|---|---|---|---|---|---|---|
| Test | Content | 1 | 2 | 3 | 4 | 5 | 6 |
| Control | | 67 | 50 | 49 | 49 | 47 | X |
| Thiodipropionate | 1.5 | 54 | | | | | |
| | 2.5 | 60 | 65 | 59 | | | |
| | 3 | 71 | | | 63 | | |
| TLPE | 2.5 | | | 61 | | | |

TABLE 1-continued

| Additives | | Result (number of items) | | | | | |
|---|---|---|---|---|---|---|---|
| Test | Content | 1 | 2 | 3 | 4 | 5 | 6 |
| Tinuvin 123 | 0.5 | 52 | 57 | 63 | 68 | 67 | |
| Tinuvin 765 | 0.5 | | | | | 43 | |
| Cupric oleate | 0.5 | | | | 33 | | |
| Tinuvin 123/thiodipropionate | 0.5/2.5 | | 72 | | | | |
| | 1/2.5 | | | 72 | | | |
| Tinuvin 765/ Thiodipropionate | 0.5/2.5 | | | | | 58 | |
| Cupric oleate/ Thiodipropionate | 0.5/2.5 | | | | 46 | | |
| Tinuvin 123/ Phenolic phosphite 29 | 1/0.11 | | | 72 | | | |
| Octyl adipate/ Phenolic phosphite 32 | 1/0.11 | | | | 47 | | |
| Octyl adipate/ Phenolic phosphite 32/ Tinuvin 123 | 1/0.11/0.5 | | | | | 80 | |

Content: parts by weight per 100 parts of silicone composition

EXAMPLE 2

Preparation of a Silicone Composition which Crosslinks at Room Temperature by a Polyaddition Reaction 1) Component A The following constituents are homogenized at room temperature (23° C.) in a kneader:

20 parts by weight of pyrogenic silica, having a BET specific surface of 300 m²/g, treated with hexamethyldisilazane, 48 parts of a polydimethylsiloxane oil blocked at each of the ends of the chains by a $(CH_3)_2ViSiO_{0.5}$ unit (Vi=vinyl group) having a viscosity of 600 mPa·s at 25° C. and comprising 0.014 Si—Vi functional group per 100 g of oil, 12 parts of a polydimethylsiloxane oil blocked at each of the ends of the chains by a $(CH_3)_2ViSiO_{0.5}$ unit having a viscosity of 60,000 mPa·s at 25° C. and comprising 0.003 Si—Vi functional group per 100 g of oil, 20 parts of a polydimethylsiloxane oil blocked at each of the ends of the chains by a $(CH_3)_3SiO_{0.5}$ unit having a viscosity of 50 mPa·s at 25° C., and 2.7 ppm, calculated by weight, of platinum metal contributed by a solution in divitetramethylsiloxane of a platinum complex comprising 12% by weight of platinum with divitetramethyldisiloxane as ligand (Karstedt catalyst).

2) Component B

The following constituents are homogenized at room temperature (23° C.) in a kneader:

16 parts by weight of pyrogenic silica, having a BET specific surface of 300 m²/g, treated with hexamethyldisilazane, 40 parts of a polydimethylsiloxane oil blocked at each of the ends of the chains by a $(CH_3)_2ViSiO_{0.5}$ unit (Vi=vinyl group) having a viscosity of 600 mPa·s at 25° C. and comprising 0.014 Si—Vi functional group per 100 g of oil, 44 parts of a poly(dimethyl)(hydromethyl)siloxane oil blocked at each of the ends of the chains by a $(CH_3)_3SiO_{0.5}$ unit having a viscosity of 20 mPa·s at 25° C. and comprising 0.26 Si—H functional group per 100 g of oil, 0.11 part of methylvinylpolysiloxane cyclic tetramer comprising 1.16 Si—Vi functional groups per 100 g of compound, and the desired amount of additive(s).

3) Processing

The RTV composition is obtained by mixing 100 parts of Component A with 10 parts of Component B. The mixture is stirred under a vacuum of 20×10² Pa for 10 minutes for the degassing. The entire mixture is subsequently cast in appropriate moulds. The moulded product is crosslinked at room temperature (23° C.) and the moulds are emptied after 4 days.

4) The Additive Tinuvin 123 (See Example 1) According to the Invention is Introduced in Component B The resin which is used for the moulding is Synolyte 562 from DSM (styrene content: approximately 30%), distributed by the Group Vaissière-Favre, Genay, France.

The results appear in the following Table 2:

| Additive tested | Content | Number of items | Appearance of the items |
| --- | --- | --- | --- |
| Without additive | | 27 | |
| Tinuvin 123 | 0.5% | 37 | No apparent inhibition |
| Tinuvin 123 | 1% | 37 | |

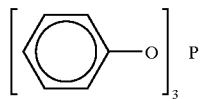

I

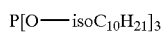

II

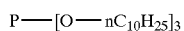

III

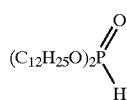

IV

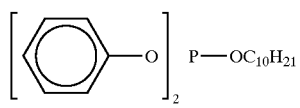

V

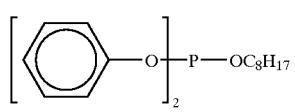

VI

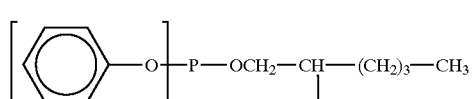

VII

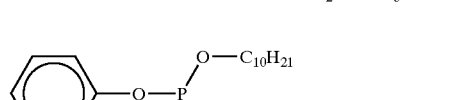

VIII

IX

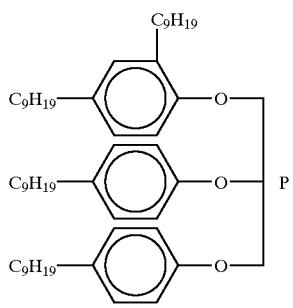

X

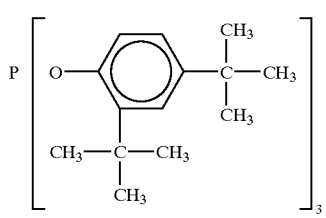

XI

What is claimed is:

1. A process, for increasing the longevity of moulds produced from an elastomer-precursor silicone composition crosslinking by a polyaddition or polycondensation reaction, comprising the step of adding a stabilizing amount of an additive to the elastomer-precursor silicone composition, the additive being:

(aii) an antioxidant additive selected from the group consisting of tetra(thioether)pentaerythritols, (b) an additive which is an inhibitor of free radicals and which is capable, under the conditions of the moulding, of generating radicals, wherein additive (b) comprises at least one group of the following formula:

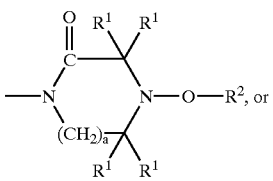

additive (b) has the following formula:

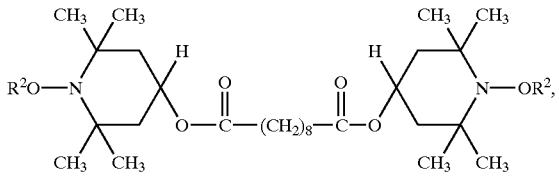

wherein $R^2$ is a linear or branched $C_1$ to $C_{18}$ alkyl, optionally substituted by one or more phenyl groups, a $C_5$ to $C_6$ cycloalkyl or a benzyl, a is 0 or 1, and the R' groups, which are identical to or different from one another, are linear $C_1$ to $C_3$ alkyl, branched $C_1$ to $C_3$ alkyl, phenyl, or benzyl groups, a synergistic combination of (aii)+(b) or (ai)+(b),
wherein (ai) is a thiopropionate anti-oxidant additive of formula:

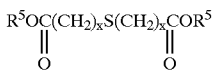

wherein $R^5$ is an alkyl group having from 1 to 15 carbon atoms inclusive and x is an integer of between 1 and 4 inclusive, a synergistic combination of (aii) or (ai) with a phosphite (c), wherein (ai) is an additive as defined above, a synergistic combination of (b) with a phosphite (c), or a synergistic combination of (ai) or (aii) and (b) with phosphites (c), with the proviso that bis (1-octyloxy-2,2,6,6-tetramethyl-4-piperidyl) sebacate is being excluded as sole stabilizing additive in a mould made of a silicone elastomer-precursor crosslinked by a polycondensation reaction.

2. A process according to claim 1, wherein the moulds are intended to be used for the moulding of polyester items.

3. A process according to claim 1, wherein the phosphite (c) is an alkyl phosphite, a mixed alkyl aryl phosphite, or an aryl phosphite.

4. A process according to claim 1, wherein the additive (b) is bis(1-octyloxy-2,2,6,6-tetramethyl-4-piperidyl) sebacate.

5. A process according to claim 1, wherein the phosphite (c) is selected from the group consisting of the following compounds:

triphenyl phosphite,
triisodecyl phosphite,
trilauryl phosphite,
dilauryl phosphite,
diphenyl isodecyl phosphite,
diphenyl isooctyl phosphite,
diphenyl 2-cthylhexyl phosphite,
diisodecyl phenyl phosphite,
tirnononoylphenyl phosphite,
2,4-dinonylphenyl di(4-monononylphenyl)phosphite,
tris(2,4-di(tert-butyl)phenyl)phosphite, and
2,2-methylenebis(4,6-di(t-butyl)phenyl)octyl phosphite.

6. A process for increasing the longevity of moulds produced from an elastomer-precursor silicone composition crosslinking by a polyaddition or polycondensation reaction, comprising the step of adding a stabilizing amount of an additive to the elastomer-precursor silicone composition, the additive being:

(aii) an antioxidant additive selected from the group consisting of tetra(thioether)pentaerythritols, (b) an additive which is an inhibitor of free radicals and which is capable, under the conditions of the moulding, of generating radicals, wherein additive (b) comprises at least one group of the following formula:

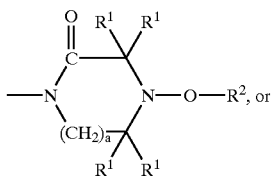

additive (b) has the following formula:

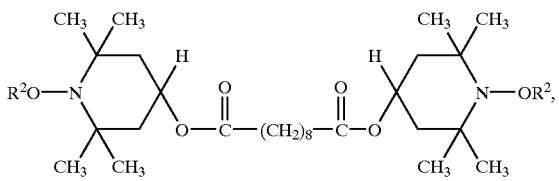

wherein $R^2$ is a linear or branched $C_1$ to $C_{18}$ alkyl, optionally substituted by one or more phenyl groups, a $C_5$ to $C_6$ cycloalkyl or a benzyl, a is 0 or 1, and the $R^1$ groups, which are identical to or different from one another, are linear $C_1$ to $C_3$ alkyl, branched $C_1$ to $C_3$ alkyl, phenyl, or benzyl groups a synergistic combination of (aii)+(b) or (ai)+(b), wherein (ai) is:
ditridecyl thiodipropionate
distearyl 3,3'-thiodipropionate, or
dilauryl 3,3'-thiodipropionate, a synergistic combination of (aii) or (ai) with a phosphite (c), wherein (ai) is an additive as defined above, a synergistic combination of (b) with a phosphite (c), or a synergistic combination of (ai) or (aii) and (b) with phosphites (c), with the proviso that bis (1-octyloxy-2,2,6,6-tetramethyl-4-piperidyl) sebacate is being excluded as sole stabilizing additive in a mould made of a silicone elastomer-precursor crosslinked by a polycondensation reaction.

7. An elastomer-precursor silicone comprising:

(A) a diorganopolysiloxane oil having reactive groups which are i) hydroxyl, condensable, or hydrolysable terminal groups or ii) alkenyl groups bonded to silicon;

(B) optionally, a compound which is a silane comprising condensable or hydrolysable groups, in the case where (A) belongs to the group i), or a diorganopoly-siloxane oil carrying hydrogen atoms, in the case where (A) belongs to the group ii);

(C) a catalyst, with the further proviso that a chelated titanium catalyst is excluded;

(E) an additive capable of stabilizing the silicone elastomer constituting a mould with respect to a materials to be moulded, the additive being (aii) an antioxidant additive selected from the group consisting of tetra(thioether)pentaerythritols, (b) an additive which is an inhibitor of free radicals and which is capable, under the conditions of the moulding, of generating radicals, wherein additive (b) comprises at least one group of the following formula:

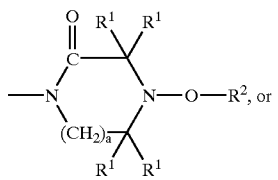

additive (b) has the following formula:

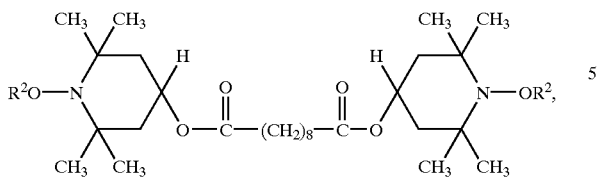

wherein $R^2$ is a linear or branched $C_1$ to $C_{18}$ alkyl, optionally substituted by one or more phenyl groups, a $C_5$ to $C_6$ cycloalkyl or a benzyl, a is 0 or 1, and the $R^1$ groups, which are identical to or different from one another, are linear $C_1$ to $C_3$ alkyl, branched $C_1$ to $C_3$ alkyl, phenyl, or benzyl groups, a synergistic combination of (aii)+(b) or (ai)+(b),
wherein (ai) is a thiopropionate anti-oxidant additive of formula:

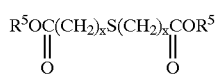

wherein $R^5$ is an alkyl group having from 1 to 15 carbon atoms inclusive and x is an integer of between 1 and 4 inclusive, a synergistic combination of (aii) or (ai) with a phosphite (c), wherein (ai) is an additive as defined above, a synergistic combination of (b) with a phosphite (c), or a synergistic combination of (ai) or (aii) and (b) with phosphites (c), with the proviso that bis (1-octyloxy-2,2,6,6-tetramethyl-4-piperidyl) sebacate is being excluded as sole stabilizing additive, with the further proviso that in the case ii), the additive (aii) or (ai) is necessarily used in combination with (b) or with (c).

8. An elastomer-precursor silicone according to claim 7, which can be crosslinked by a polycondensation reaction, comprising:

(A) at least one diorganopolysiloxane oil caring, at each end of the clain, at least two condensable or hydrolysable groups or a single hydroxyl group, (B) a silane comprising at least three condensable or hydrolysable groups or a product originating from the partial hydrolysis of this silane, when (A) is an oil comprising a hydroxyl end, (C) is a catalyst for the polycondensation of the oil, with the further proviso that a chelated titanium catalyst is excluded; and (E) which is not bis(1-octyloxy-2,2,6,6-tetramethyl-4-piperidyl) sebacate as sole additive.

9. A silicone composition which is an elastomer-precursor and which can be crosslinked by a polyaddition reaction according to claim 7, comprising:

(A) at least one diorganopolysiloxane oil having, per molecule, at least two alkenyl groups bonded to silicon, (B) at least one diorganopolysiloxane oil having, per molecule, at least three hydrogen atoms bonded to silicon, (C) a catalyst which is a compound of a metal from the platinum group.

10. A silicone composition which is an elastomer-precursor and which can be crosslinked by a polyaddition reaction comprising:

(A): at least one diorganopolysiloxane oil having, per molecule, at least two alkenyl groups bonded to silicon, (B): at least one diorganopolysiloxane oil having, per molecule, at least three hydrogen atoms bonded to silicon, (C): a catalyst which is a compound of a metal from the platinum group, and (E): additives (b) which are inhibitors of free radicals and which are capable, under moulding conditions, of generating radicals of the formula:

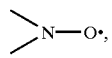

wherein additive (b) comprises at least one group of the following formula:

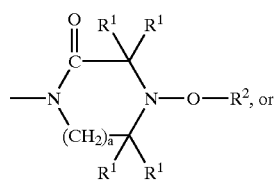

additive (b) has the following formula:

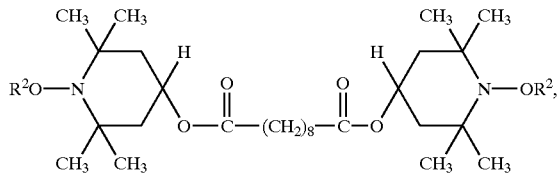

wherein $R^2$ is a linear or branched $C_1$ to $C_{18}$ alkyl, optionally substituted by one or more phenyl groups, a $C_5$ to $C_6$ cycloalkyl or a benzyl, a is 0 or 1, and the $R^1$ groups, which are identical to or different from one another, are linear $C_1$ to $C_3$ alkyl, branched $C_1$ to $C_3$ alkyl, phenyl, or benzyl groups, and, optionally: (aii) an antioxidant additive selected from the group consisting of tetra(thioether) pentaerythritols, or (ai) a thiopropionate anti-oxidant additive of formula:

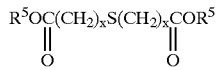

wherein $R^5$ is an alkyl group having from 1 to 15 carbon atoms inclusive and x is an integer of between 1 and 4 inclusive, or phosphites (c).

11. A composition according to claim 10, wherein the phosphite is an alkyl phosphites, a mixed alkyl aryl phosphite, or an aryl phosphate.

12. A composition according to claim 10, wherein the additive (b) is bis(1-octyloxy-2,2,6,6-tetramethyl4-piperidyl) sebacate.

* * * * *